United States Patent
Soares et al.

(10) Patent No.: US 8,643,320 B2
(45) Date of Patent: Feb. 4, 2014

(54) CONTROL SYSTEM FOR ELECTRIC MOTOR APPLIED TO CYCLIC LOADS AND CONTROL METHOD FOR ELECTRIC MOTOR APPLIED TO CYCLIC LOADS

(75) Inventors: Claudio Eduardo Soares, Joinville (BR); Dietmar Erich Bernhard Lilie, Joinville (BR); Roberto Andrich, Joinville (BR); Luiz Von Dokonal, Joinville (BR)

(73) Assignee: Whirlpool S.A., Sao Paulo (BR)

( * ) Notice: Subject to any disclaimer, the term of this patent is extended or adjusted under 35 U.S.C. 154(b) by 0 days.

(21) Appl. No.: 13/386,119

(22) PCT Filed: Jul. 22, 2010

(86) PCT No.: PCT/BR2010/000229
§ 371 (c)(1),
(2), (4) Date: Jul. 12, 2012

(87) PCT Pub. No.: WO2011/009179
PCT Pub. Date: Jan. 27, 2011

(65) Prior Publication Data
US 2012/0268048 A1    Oct. 25, 2012

(30) Foreign Application Priority Data
Jul. 22, 2009   (BR) .................................... 0902349

(51) Int. Cl.
*H02P 6/10*   (2006.01)
*H02P 29/00*  (2006.01)

(52) U.S. Cl.
USPC .................... 318/400.23; 700/56; 700/170

(58) Field of Classification Search
USPC ........... 318/11, 595, 55, 59, 66, 69, 146, 163, 318/164, 400.01, 400.2
See application file for complete search history.

(56) References Cited

U.S. PATENT DOCUMENTS 4,328,447 A * 5/1982 Davis et al. ................. 318/245
4,399,200 A * 8/1983 Galloway ..................... 429/432

(Continued)

OTHER PUBLICATIONS

Sharaf, A.M.; Masry, M., "Nonlinear speed control of large industrial DC motor drives with an energy efficiency enhancement loop," Electrical and Computer Engineering, 1998. IEEE Canadian Conference on, vol. 2, no., pp. 589,592, May 24-28, 1998 <http://ieeexplore.ieee.org/stamp/stamp.jsp?tp=&arnumber=685565&isnumber=15021.*

(Continued)

*Primary Examiner* — Eduardo Colon Santana
*Assistant Examiner* — Said Bouziane
(74) *Attorney, Agent, or Firm* — Fay Sharpe LLP

(57) ABSTRACT

The present application refers to a system and a control method especially applied to electric motors designed to drive cyclical loads. The present system includes an electric motor (10), at least an electronic control unit (20) and at least an electronic power unit (30), the electric motor (10) is electrically driven by the electronic power unit (30), the electronic power unit (30) being electrically commanded by the electronic control unit (20), the system including an average speed controller implemented by the electronic control unit (20), the average speed controller being arranged to monitor an instantaneous speed ($V_i$) of the electric motor (10) and provide an average speed value of the motor (10), the electronic control unit (20) being arranged to calculate an average voltage ($V_m$) based on the average speed obtained, the electronic power unit (30) being arranged to electrically drive the electric motor (10) by an instantaneous voltage value ($V_{ins}$), this instantaneous voltage value ($V_{ins}$) being calculated by multiplying the average voltage ($V_m$) by the result of the division between the instantaneous speed ($V_i$) and the average speed.

7 Claims, 7 Drawing Sheets

(56) References Cited

U.S. PATENT DOCUMENTS

Figure 1A:
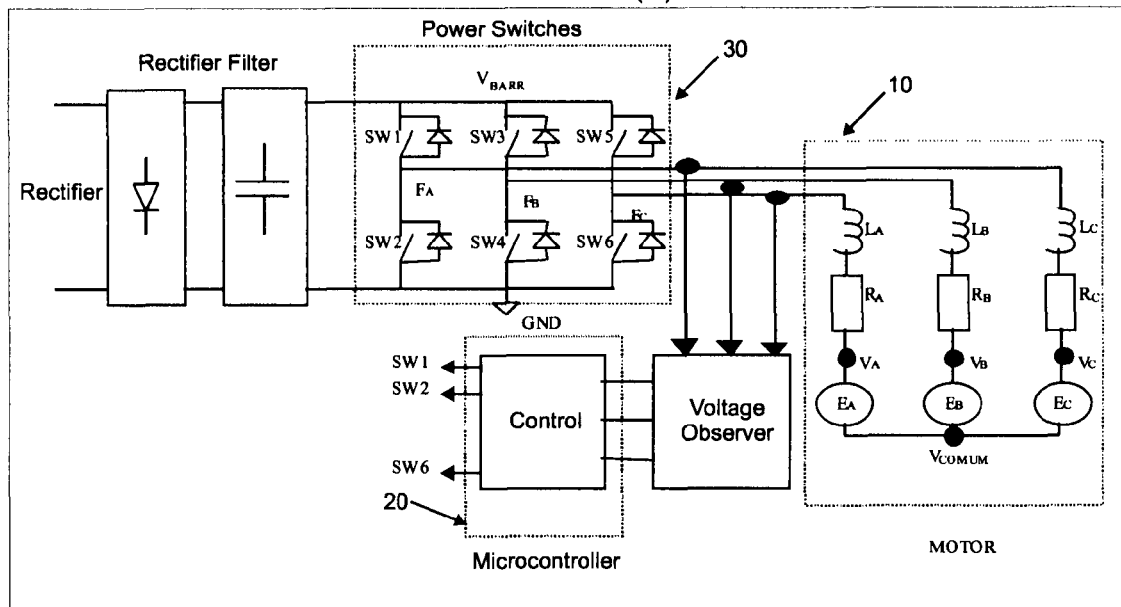

| | | | |
|---|---|---|---|
| 4,639,854 A * | 1/1987 | Kurokawa et al. | 700/37 |
| 5,577,153 A * | 11/1996 | Bocchiola | 388/811 |
| 5,625,551 A * | 4/1997 | Mitarai et al. | 700/29 |
| 6,031,966 A * | 2/2000 | Nakatani et al. | 388/805 |
| 6,459,940 B1 * | 10/2002 | Ghorbel et al. | 700/56 |
| 6,470,225 B1 * | 10/2002 | Yutkowitz | 700/44 |
| 6,741,056 B1 * | 5/2004 | Hall | 318/599 |
| 6,762,577 B2 * | 7/2004 | Gray et al. | 318/268 |
| 6,922,027 B2 * | 7/2005 | Schwarz et al. | 318/400.01 |
| 7,164,250 B2 * | 1/2007 | Boscolo et al. | 318/400.42 |
| 7,321,211 B2 * | 1/2008 | Peterson | 318/432 |
| 2003/0107341 A1 * | 6/2003 | Morris | 318/599 |
| 2004/0169482 A1 * | 9/2004 | Maeda | 318/443 |
| 2005/0248301 A1 * | 11/2005 | Trifilo | 318/268 |
| 2007/0272274 A1 * | 11/2007 | Adam et al. | 134/18 |
| 2008/0152325 A1 * | 6/2008 | Bae et al. | 388/811 |
| 2012/0274250 A1 * | 11/2012 | Soares et al. | 318/400.23 |
| 2013/0033212 A1 * | 2/2013 | Hong et al. | 318/400.35 |

OTHER PUBLICATIONS

International Search Report mailed Sep. 14, 2012 for International application No. PCT/BR2010/000229.

International Preliminary Report on Patentability and Written Opinion mailed Oct. 11, 2012 for International application No. PCT/BR2010/000229.

* cited by examiner (a)

(b)

(a)

(c)

(b)

(d)

(a)

(b)

(a)

(b)

(a)

(c)

(b)

(d)

(a)

(b)

(a)

(c)

(b)

(d)

CONTROL SYSTEM FOR ELECTRIC MOTOR APPLIED TO CYCLIC LOADS AND CONTROL METHOD FOR ELECTRIC MOTOR APPLIED TO CYCLIC LOADS

The present invention refers to a system and method for controlling electric motors, and especially permanent magnet motors, of the Brushless DC trapezoidal type, with the aim of optimizing the efficiency of electric energy consumption in driving the cyclical loads.

More particularly, the present invention is recommended for applications that involve the use of cyclical loads, such as those found in compressors, which have a much higher torque during the compression cycle compared to the torque existing during the suction cycle.

DESCRIPTION OF THE STATE OF THE ART

Permanent magnet motors of the Brushless DC type are becoming evermore popular in applications requiring low cost and high performance. Motors of the Brushless DC type are similar to DC motors mounted upside down, where the permanent magnets are mounted on the rotor. While in DC motors the reversal of the current is carried out by the switch and the brushes, in the case of Brushless DC motors, the current is reversed by power inverters which drive the stator coils.

To obtain maximum torque and highest efficiency in the consumption of energy, it is necessary to synchronize the current with the induced voltage in the phases of the motor. This can be done by using sensors coupled to the motor shaft or by observing the induced voltages, or currents, in the motor phases. The sensors coupled to the motor shaft have the drawback of adding extra elements to the design of the motor, considerably increasing the final cost of the solution. Moreover, limitations of space and the environment itself to which the motor is subject, may render the use of these types of sensors unfeasible. This is why the use of voltage or current observers constitutes the best choice in most cases.

North American U.S. Pat. No. 6,922,027 discloses a technique that uses a voltage observer built with a network formed by voltage comparators, capacitors and resistors. The comparators output is sent to a microprocessor which determines the commutation instants of the motor drive. Although the solution is microprocessed, it requires the use of many external components.

ANDRICH et al. uses a technique where the three phases of the motor are shown, treated mathematically, and then compared with each other to determine the commutation instants of the motor. The advantages of this technique are the elimination of the analogical circuits in determining the position of the motor, the flexibility in the adjustments of the observer according to the mechanical structure of the motor, lower sensitivity to the parametric variations of the components and the possibility of calibrating the circuit.

The Brushless DC Motors can be used in driving the compressors applied to cooling systems. This type of application satisfies the cyclical load conditions defined in the scope of this invention. The aim of applying this type of motor to cooling systems is the variation of the system's cooling capacity, which can be controlled by varying the cooling flow. The cooling flow quantity, in turn, is directly proportional to the average speed of the motor. Accordingly, the main specification of the controller should be the control of the average rotation speed.

The working of the compressor can be divided into two operating stages: the suction stage and the compression stage. Suction occurs at the beginning of each cycle and is characterized by the piston retreat within the cylinder. During this processing, the cylinder is filled with the cooling fluid. The compression cycle, in turn, begins when the piston reverses its displacement direction. During this stage, the fluid is compressed inside the cylinder. Compressing the fluid generates a much greater torque than the average torque resulting from a complete mechanical round. Bearing in mind that this behavior is repeated every mechanical round, a cyclical behavior can be seen in the variation of the torque during the working of the motor.

The torque variation within a mechanical round causes a variation in the motor speed, decreasing the speed of the motor during the compression cycle. Generally, there is no offset in the control action to adjust the instantaneous speed of the motor within a mechanical round, so as to offset the speed during the compression cycle. The controllers developed for driving the compressors assume that what is important for the cooling system is the control of the average cooling flow, which is basically defined by the average rotation speed.

However, the simple control of the average speed of the motor may present distortions in the waveform of the current due to the variation of the rotation during the suction and compression cycles. This deformation in the waveform of the current is not desirable because it decreases the efficiency of the electric energy consumption due to the reduction of the motor power factor.

Bearing in mind the compression cycle, for example, it is noted that the induced voltage in the motor sustains a reduction of amplitude due to the reduction in speed caused by increased torque. Conventional controllers do not act to modify the average voltage applied to the motor and this is why there is an increase in the difference in potential applied to the motor coils, which is defined as being the difference between the voltage applied by the inverter and the induced voltage of the motor. The increase in the difference in potential applied to the motor coils then causes an increase in the current during the compression cycle. In the same way, in the suction cycle the current decreases due to the reduction in amplitude of the induced voltage in the motor.

Hence, the current applied in the motor increases during the compression cycle and decreases during the suction cycle. This behavior is exactly the opposite in the behavior of the induced voltage, which decreases during the compression cycle and increases during the suction cycle. The impact of this reverse behavior between the voltage and the current is on the motor power factor, a factor that decreases as the waveform of the current becomes different to the waveform of the induced voltage.

BRIEF DESCRIPTION AND OBJECTIVES OF THE INVENTION

The objective of the present invention is to improve the Brushless

DC motor power factor applied to the drive of cyclical loads, by way of adjusting the waveform of the current applied to the motor. This adjustment in the waveform of the current should be carried out due to the variations in the induced voltage of the motor resulting from variations in speed within a mechanical round.

A means of achieving the objectives of the present invention is by the provision of a control system for electric motor, comprising an electric motor, at least an electronic control unit and at least an electronic power unit, the electric motor being electrically driven by the electronic power unit, the electronic power unit being electrically commanded by the electronic control unit, the system comprising an average speed controller implemented by way of the electronic control unit, the average speed controller being arranged to monitor an instantaneous speed of the electric motor and to provide an average speed value of the motor, the electronic control unit being arranged to calculate an average voltage based on the average speed obtained, the electronic power unit being arranged to electrically drive the electric motor by way of an instantaneous voltage value, this instantaneous voltage value being calculated by multiplying the average voltage by the result of the division between the instantaneous speed and the average speed.

Another means of achieving the objectives of the present invention is by the provision of a control method for electric motor, said method having the following steps:

i) calculate an average speed of the electric motor based on a reading of an instantaneous speed of the motor, ii) calculate, using the average speed of the prior step, an average voltage, iii) monitor an instantaneous speed of the electric motor, iv) electrically drive the electric motor, by way of an instantaneous voltage value, this instantaneous voltage value being calculated by multiplying the average voltage by the result of the division between the instantaneous speed and the average speed.

The system and method described above implement the adjustment in the waveform of the current, pursuant to the teachings of the present invention. Accordingly, the control method modifies the voltage to be applied to the motor multiplying the average voltage, previously defined by the speed control, by the division between the instantaneous speed and the average speed. The correction performed in the voltage applied to the motor, in the manner described, manages to adjust the waveform of the current so that it is similar to the waveform of the induced voltage.

This work also highlights that the imposition of any change in the current will occur by way of altering the instantaneous voltage delivered to the motor, without altering the average voltage calculated by the speed control network.

SUMMARY DESCRIPTION OF THE DRAWINGS

Figure 1B:
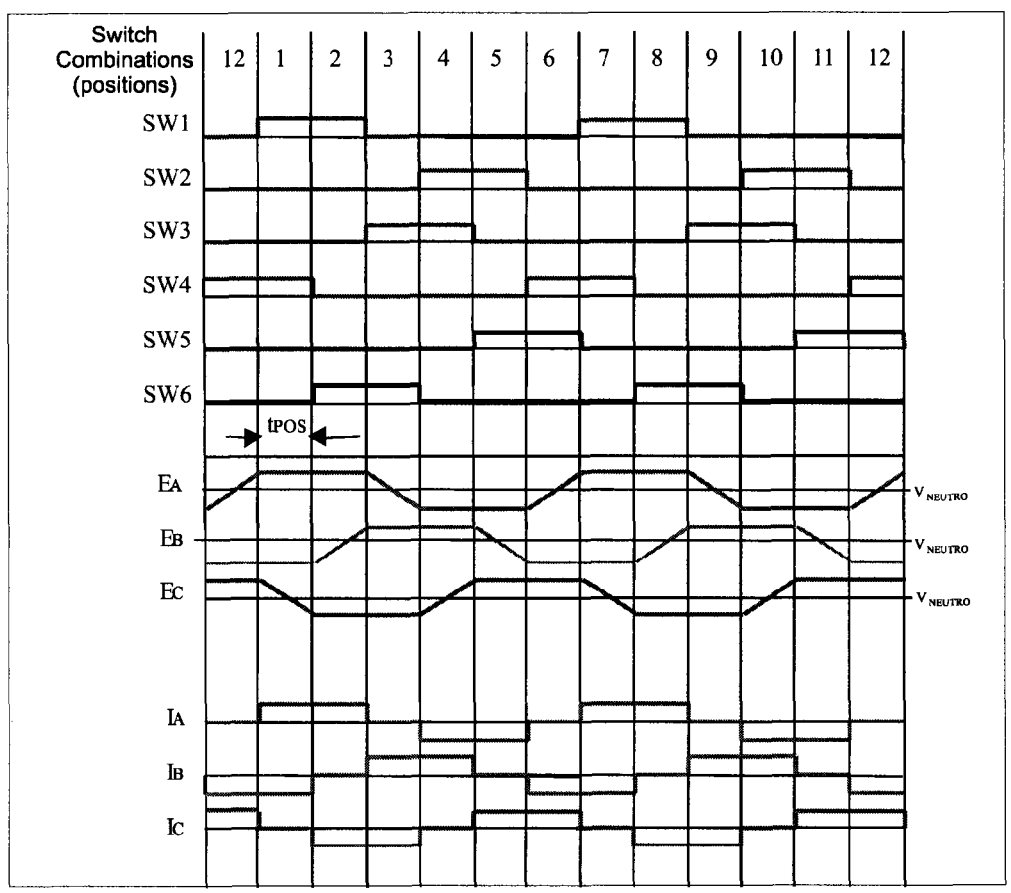
Figure 2:
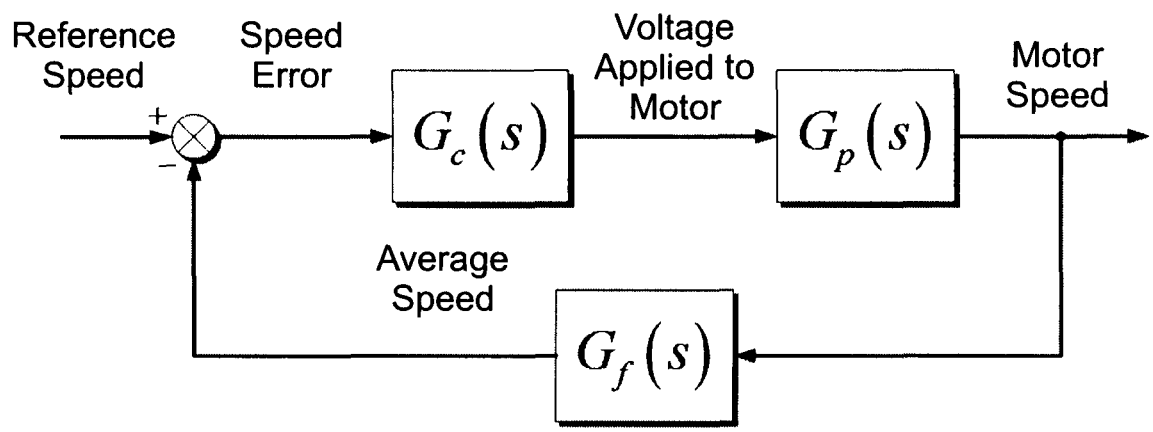
Figure 3:
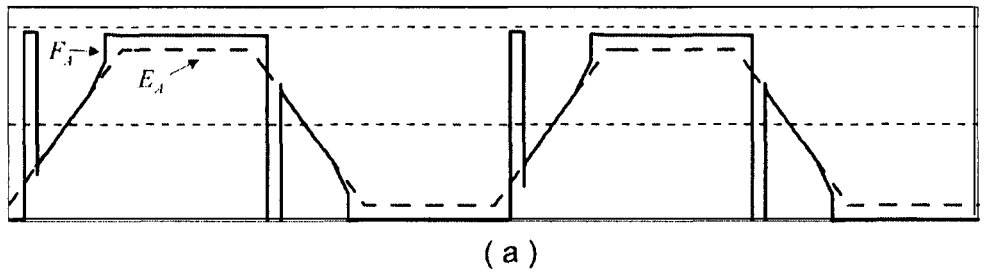
Figure 3:
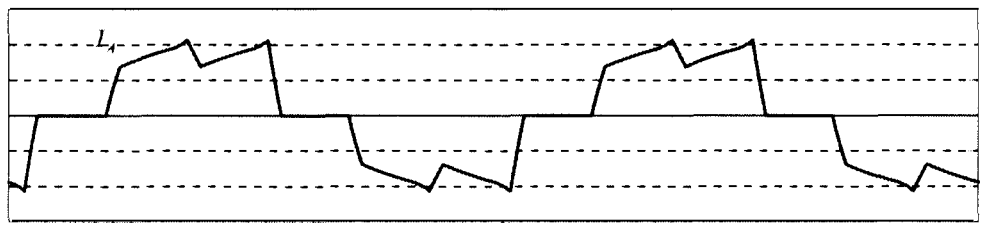
Figure 4:
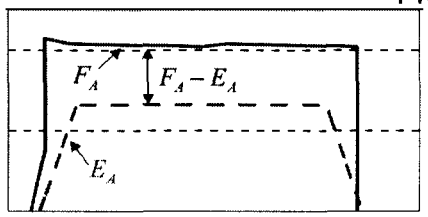
Figure 4:
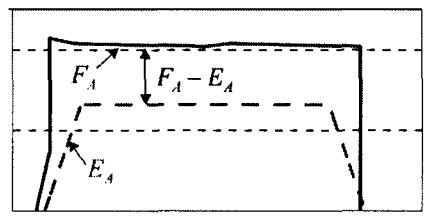
Figure 4:
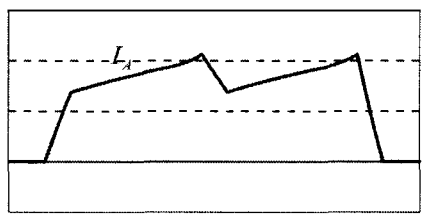
Figure 4:
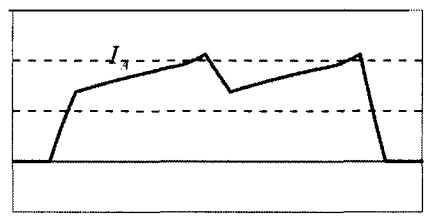
Figure 5:
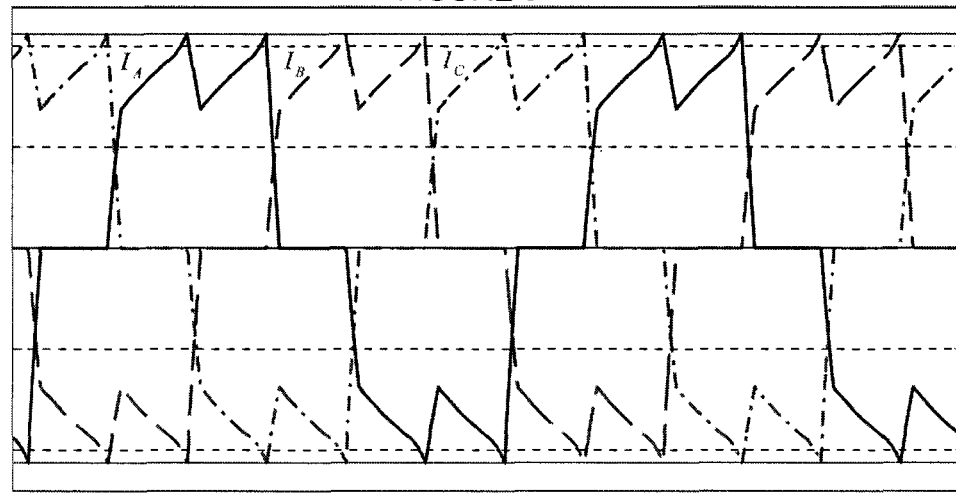
Figure 6:
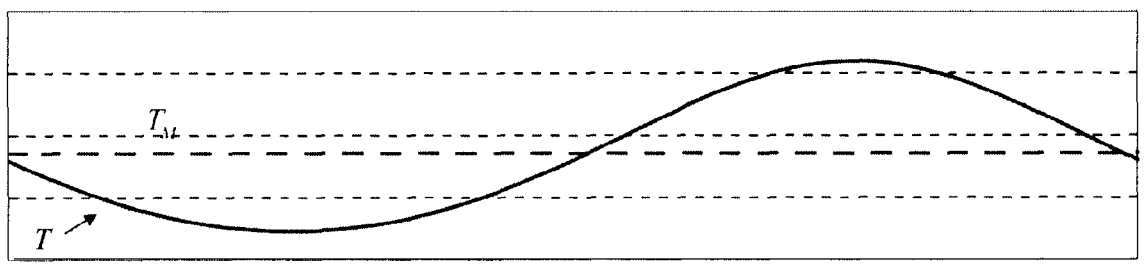
Figure 6:
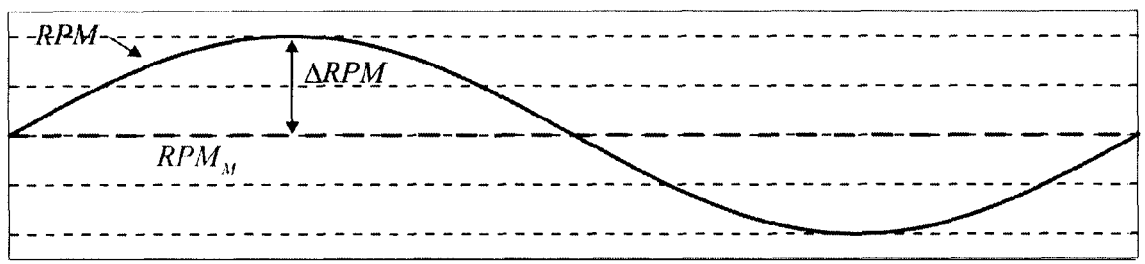
Figure 7:
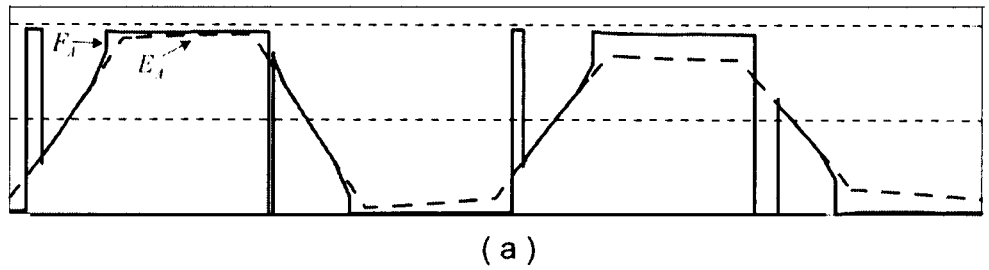
Figure 7:
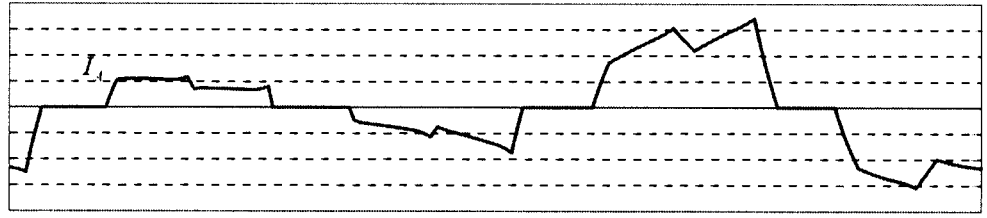
Figure 8:
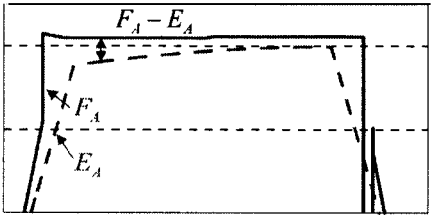
Figure 8:
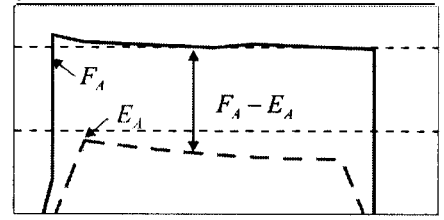
Figure 8:
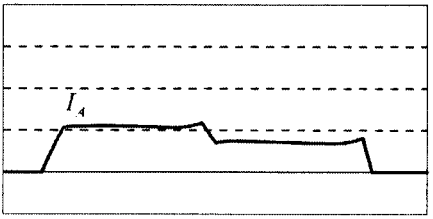
Figure 8:
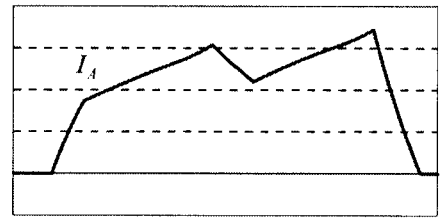
Figure 9:
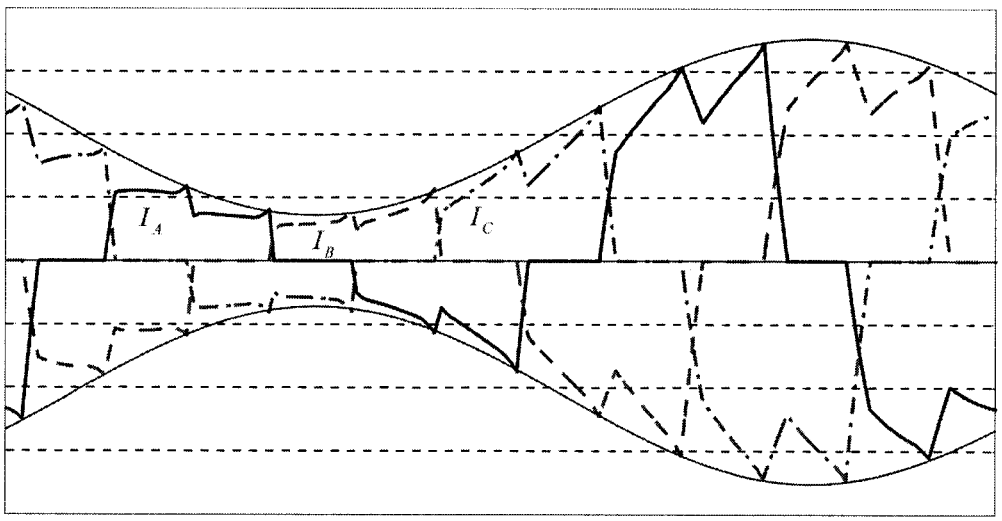
Figure 10:
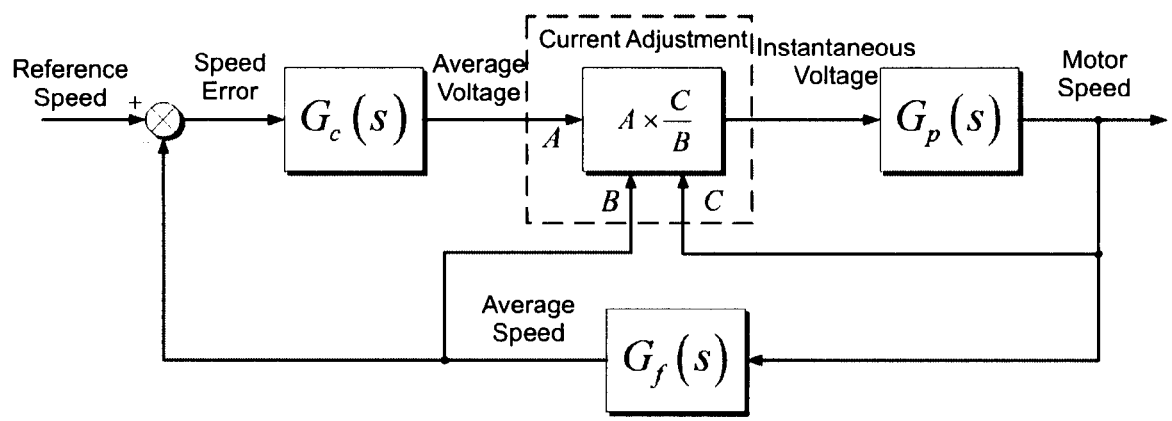
Figure 11:
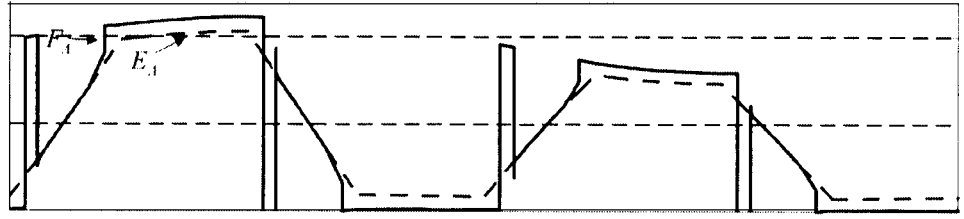
Figure 11:
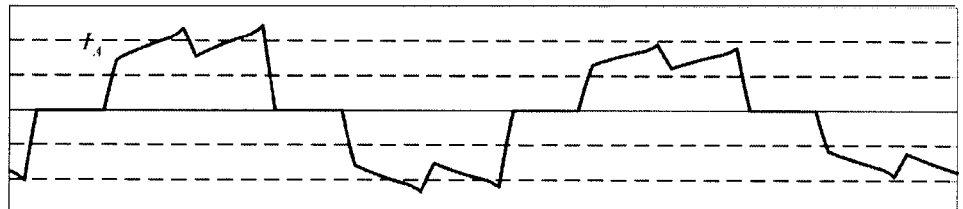
Figure 12:
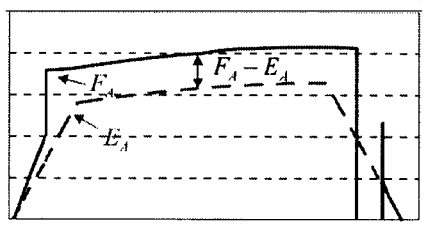
Figure 12:
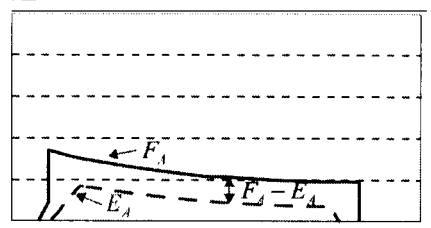
Figure 12:
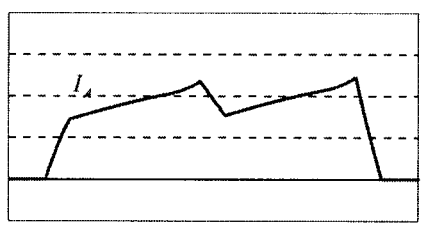
Figure 12:
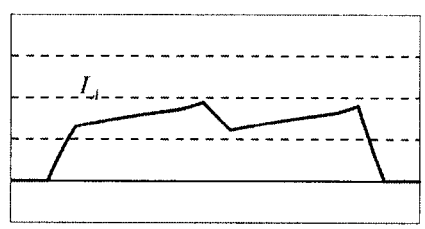

The invention will be described with reference to the accompanying drawings, provided for explanatory purposes and wherein:

FIG. 1: (a) represents a block diagram of a drive system of a permanent magnet motor of the Brushless DC type, three-phase with 4 poles, with trapezoidal voltages at a level of 120° electrical degrees. The diagram comprises a rectifier, a capacitive filter, a three-phase inverter, characterized by the set of power switches, a permanent magnet motor, a voltage observer and a control unit. In (b), the waveforms characteristic of the drive of the electric motor;

FIG. 2: presents the block diagram for driving the electric motor using an average speed controller. The control of this solution is by monitoring the average speed of the motor;

FIG. 3: (a) waveforms of the induced voltage EA and the average voltage applied FA in one of the phases of the motor, to a constant load applied to the motor shaft. In this same case, (b) presents the current waveform of the motor;

FIG. 4: (a) and (c) detail of the difference between the voltage applied to the motor FA and the induced voltage EA in different instants, within a mechanical period. Additionally, (b) and (d) show the respective currents resulting in the motor;

FIG. 5: Current in the three phases of the motor resulting from the control method of the average speed applied to a constant load. The currents of the three phases present an identical waveform within a mechanical round;

FIG. 6: characteristic curve of a cyclical load applied to a motor driven by an average speed controller;

FIG. 7: (a) presents the waveforms of the induced voltage EA and of the voltage applied to the motor FA. (b) presents the waveform of the current resulting in the motor. The variation of the induced voltage EA is a direct consequence of the variation of the speed of the motor within a mechanical round;

FIG. 8: (a) detail of the difference between the voltage applied to the motor FA and the induced voltage EA during the instant of maximum speed. (b) current resulting during the instant of maximum speed. (c) detail of the difference between the voltage applied to the motor FA and the induced voltage EA during the instant of minimum speed. (d) current resulting during the instant of minimum speed;

FIG. 9: presents the current in the three phases of the motor resulting from the control method of the average speed applied to the cyclical load;

FIG. 10: block diagram of the control method proposed for improving the motor power factor. The block responsible for adjusting the waveform of the current is highlighted in the drawing;

FIG. 11: (a) presents the waveforms of the induced voltage EA and of the voltage applied to the motor FA corrected by the proposed control method. (b) presents the waveform of the current resulting in the motor;

FIG. 12: (a) detail of the voltage applied to the motor FA corrected by the control method proposed and the induced voltage EA during the instant of maximum speed. (b) current resulting during the instant of maximum speed. (c) detail of the voltage applied to the motor FA corrected by the control method proposed and the induced voltage EA during the instant of minimum speed. (d) current resulting during the instant of minimum speed; and FIG. 13: presents the current in the three phases of the motor corrected by the control method proposed in this invention.

DETAILED DESCRIPTION OF THE DRAWINGS

FIG. 1 (a) shows the basic arrangement of a control diagram and (b) the ideal waveforms existing in the drive of an electric motor 10, in this case a permanent magnet motor of the Brushless DC type three-phase with four poles, trapezoidal wave.

By way of example, hereinafter, this motor shall be used for analyzing the remaining graphics. However, the invention is also valid for any permanent magnet motor of the Brushless DC type. Under normal working, the control analyzes the input of the voltage and/or current observer and drives switches SW1 to SW6 in the sequence indicated in FIG. 1 (b), pursuant to the position detected.

Additionally, it is known that by using sensors coupled to the motor shaft, observers of induced voltages, or currents, it is possible to measure the speed of the motor. In the proposed arrangement, a voltage observer as illustrated in FIG. 1 (a) was used, although any other speed measuring device can be applied to the invention presented.

FIG. 2 shows a block diagram of a control by average speed of an electric motor 10. This typical arrangement shows the motor and the inverter, as well as a sensor which can monitor the speed. In this case, the controller is responsible for processing the information on speed coming from the sensor jointly with the reference, or setpoint, defined by the system.

FIG. 3, in turn, presents the response of the electric motor 10 driven by a conventional controller of average speed for the case of imposing a constant load on the shaft. The condition of the constant load is favorable to this kind of control, since the real rotation speed remains constant during a mechanical cycle.

This constant behavior of the speed is reflected in the induced voltage waveform in the motor. As per FIG. 3 (a), the induced voltage maintains a uniform shape, that is, it does not alter during a mechanical cycle. As a consequence, the waveform resulting from the current in the motor also assumes a uniform behavior, and does not alter during the mechanical round, as presented in FIG. 3 (b).

FIGS. 4 (a) and (c) detail the difference between induced voltage EA and the voltage FA applied to the electric motor 10, which remains approximately constant within the mechanical round. FIGS. 4 (b) and (d) show that the waveform of the phase current resulting in the motor 10 are also identical within a mechanical round, due to the maintenance of the difference between the induced voltage EA and the voltage FA applied to the motor.

Consequently, as can be seen in FIG. 5, the waveforms of the currents resulting in the three phases of the motor are identical, not demonstrating any kind of distortion during the mechanical cycle.

However, in the case of driving cyclical loads, such as that foreseen for compressors applied to cooling systems, said behavior does not apply.

FIG. 6 presents an example of cyclical load, which is comprised of an oscillation around an average TM operating point. A load with a typically cyclical characteristic is the load generated by an alternative compressor. The impact on the motor speed, operating by conventional controller of average speed, is an oscillation around the average speed RPMM.

The speed oscillation causes a variation in amplitude of the induced voltage EA, which is shown in FIG. 7. As the voltage applied to the motor FA by the speed controller is constant during a mechanical round, the higher the induced voltage EA the lower the IA current resulting from the motor.

Therefore, during the instant of maximum speed, highlighted in FIGS. 8 (a) and (b), the induced voltage EA comes very close to the voltage applied to the motor FA. As a consequence, there is a decrease in the amplitude of the IA current. During the instant of minimum speed, highlighted in FIGS. 8 (c) and (d), the reverse phenomenon occurs.

The impact of the variation in speed on the currents of the motor is summarized in FIG. 9, clearly showing the distortion of the currents of phases IA, IB and IC within a mechanical round. The decrease of the current resulting in the motor during the increase of the induced voltage, or the increase of the current during the decrease of the induced voltage, directly impacts the reduction of the motor power factor.

Therefore, to improve the motor power factor, the current should have the same format as the induced voltage. Therefore, when there is a decrease in the induced voltage it is necessary to reduce the current and vice-versa. But the phenomenon that occurs using the conventional speed controller is precisely the opposite. This current variation which is disproportional to the induced voltage during a mechanical round of the motor prejudices the motor power factor and consequently decreases the efficiency of the system.

Along these lines, the present invention provides a system and a method especially designed to optimize the motor power factor applied to the drive of the cyclical loads, whereby adjusting the waveform of the current of the electric motor 10. The control system proposed is represented in the form of block diagrams in FIG. 10. The block responsible for adjusting the waveform of the current is highlighted in the drawing.

The control system for electric motor applied to cyclical loads, as conceived, comprises an electric motor 10, at least an electronic control unit 20 and at least an electronic power unit 30.

The electric motor 10 is electrically driven by the electronic power unit 30, the latter, as illustrated in FIG. 1a, being driven by a set of electronic power switches SW2N arranged to control a voltage of each phase of the electric motor 10.

Further, said electronic power unit 30 is electrically commanded by the electronic control unit 20.

Innovatively, compared to prior arts, the present system comprises an average speed controller, implemented by the electronic control unit 20, such that the average speed controller is arranged to monitor an instantaneous speed $V_i$ of the electric motor 10, and thus provide an average speed value of the motor 10.

In turn, the electronic control unit 20 is arranged to calculate an average voltage $V_a$, based on the average speed obtained. In contrast, the electronic power unit 30 is arranged to electrically drive the electric motor 10 by an instantaneous voltage value $V_{ins}$, this instantaneous voltage value $V_{ins}$ being calculated by multiplying the average voltage $V_a$ by the result of the division between the instantaneous speed $V_i$ and the average speed.

As already mentioned, the present invention is preferably idealized for Brushless DC type motors, however, other similar motors can be used, according to the teachings of the present invention.

Within the scope of the present invention, it is provided that the instantaneous voltage value $V_{ins}$ is calculated so as to provide a current waveform of the electric motor 10 substantially aligned to a waveform of its induced voltage.

Additionally, the present invention provides for the use of a filter arranged to improve the speed reading of the electric motor 10.

As mentioned previously, the present invention also provides a control method for an electric motor 10, especially designed for a motor that uses cyclical loads.

Said method, implemented by way of the system described above, essentially comprises the following steps:

i) calculate an average speed $RPM_{average}$ of the electric motor 10 based on the reading of an instantaneous speed $V_{ins}$ of the motor, ii) calculate, using the average speed of the prior step, an average voltage $V_a$, iii) monitor an instantaneous speed $V_i$ of the electric motor 10, and iv) electrically drive the electric motor 10, by way of an instantaneous voltage value $V_{ins}$, this instantaneous voltage value $V_{ins}$ being calculated by multiplying the average voltage $V_a$ by the result of the division between the instantaneous speed $V_{ins}$ and the average speed.

Therefore, the control method, according to the teachings of the present invention, modifies the voltage to be applied to the electric motor 10, multiplying the average voltage $V_a$, previously defined by the speed control, by the division between the instantaneous speed $V_i$ and the average speed $RPM_{average}$ $$V_{ins} = V_m \times \frac{V_i}{RPM_{médio}}$$

The correction carried out in the voltage applied to the motor, as described, manages to adjust the waveform of the current so that it is similar to the waveform of the induced voltage. FIG. 11 (a) presents the waveforms of the induced voltage EA and of the voltage applied to the motor FA. The amplitude of the corrected current IA, shown in FIG. 11 (b), is thereafter directly proportional to the induced voltage EA.

Hence, during the instant of maximum speed, highlighted in FIGS. 12 (a) and 12 (b), the voltage applied FA to the motor is increased, providing an increase in the amplitude of the current IA. During the instant of minimum speed, highlighted in FIGS. 12 (c) and 12 (d), the reverse phenomenon occurs.

Figure 13:
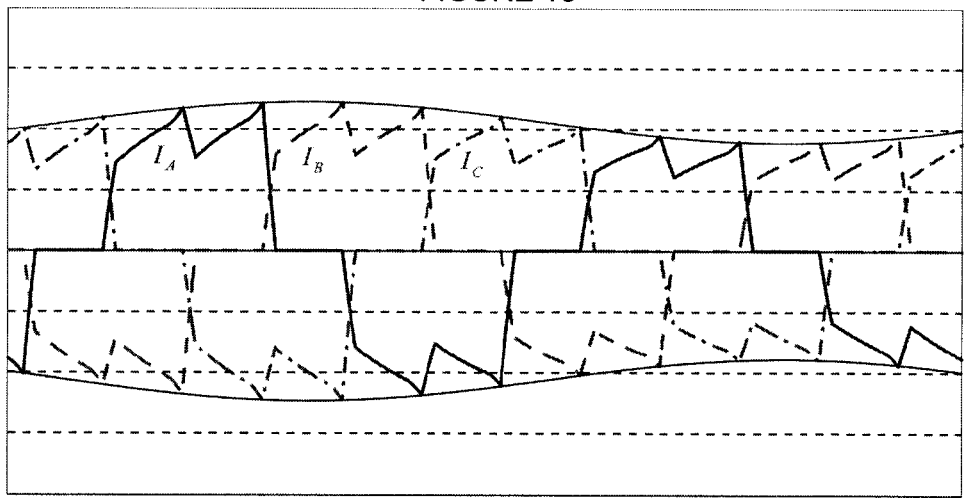

The result of the adjustment of the currents of phases IA, IB and IC is presented in FIG. 13. In this sense, the oscillations now presented by the current favor the improvement of the power factor, as they are in phase with the same variations presented by the induced voltage.

In light of the above, the present invention offers, advantageously compared to prior arts, an optimized control for electric motors operated by cyclical loads, significantly reducing the consumption of electric energy of the equipment, when taking into account an increase in the adjusted power factor pursuant to the system and method now proposed.

Lastly, it must be pointed out that the invention in question is also especially advantageous for applications in which cooling compressors are used, since they work in operating cycles significantly aligned with the control proposal of the object now claimed.

Having described an example of a preferred embodiment, it should be understood that the scope of the present invention encompasses other possible variations, and is only limited by the content of the claims appended hereto, potential equivalents being included therein.

The invention claimed is:

1. Control system for electric motor applied to cyclical loads, the control system comprising:
    an electric motor (10);
    at least an electronic control unit (20);
    at least an electronic power unit (30);
    the electric motor (10) being electrically driven by the electronic power unit (30);
    an electronic power unit (30) being electrically commanded by the electronic control unit (20),
    the control system further comprising an average speed controller implemented by the electronic control unit (20), the average speed controller being arranged to monitor an instantaneous speed ($V_i$) of the electric motor (10) and provide an average speed value $RPM_{average}$ of the motor (10), the electronic control unit (20) being arranged to calculate an average voltage ($V_m$) based on the average speed obtained, the electronic power unit (30) being arranged to electrically drive the electric motor (10) by an instantaneous voltage value ($V_{ins}$), this instantaneous voltage value ($V_{ins}$) being calculated by multiplying the average voltage ($V_m$) by the result of the division between the instantaneous speed ($V_i$) and the average speed $RPM_{average}$.

2. System according to claim 1, wherein the electric motor (10) is of the Brushless DC type.

3. System according to claim 1, wherein the electronic power unit (30) comprises a set of electronic power switches (SW2N) arranged to control a voltage in each phase of the electric motor (10).

4. System according to claim 1, wherein the instantaneous voltage value ($V_{ins}$) is calculated so as to provide a current waveform of the electric motor (10) substantially aligned to a waveform of the induced voltage in the electric motor (10).

5. System according to claim 1, further comprising a filter arranged to optimize the speed reading of the electric motor (10).

6. Control method for electric motor (10) applied to cyclical loads, the method comprising the following steps:
    i) calculating an average speed $RPM_{average}$ of the electric motor (10) based on a reading of an instantaneous speed ($V_i$) of the motor,
    ii) calculating, based on the average speed $RPM_{average}$, an average voltage ($V_m$),
    iii) monitoring an instantaneous speed ($V_i$) of the electric motor (10),
    iv) electrically driving the electric motor (10), by way of an instantaneous voltage value ($V_{ins}$), this instantaneous voltage value ($V_{ins}$) being calculated by multiplying the average voltage ($V_m$) by the result of the division between the instantaneous speed ($V_i$) and the average speed $RPM_{average}$.

7. Control method for electric motor (10) according to claim 6, wherein the steps are implemented by a control system comprising:
    an electric motor (10);
    at least an electronic control unit (20);
    at least an electronic power unit (30);
    the electric motor (10) being electrically driven by the electronic power unit (30);
    an electronic power unit (30) being electrically commanded by the electronic control unit (20);
    the control system further comprising an average speed controller implemented by the electronic control unit (20), the average speed controller being arranged to monitor an instantaneous speed ($V_i$) of the electric motor (10) and provide an average speed value $RPM_{average}$ of the motor (10), the electronic control unit (20) being arranged to calculate an average voltage ($V_m$) based on the average seed obtained the electronic power unit (30) being arranged to electrically drive the electric motor (10) by an instantaneous voltage value ($V_{ins}$), this instantaneous voltage value ($V_{ins}$) being calculated by multiplying the average voltage ($V_m$) by the result of the division between the instantaneous speed ($V_i$) and the average speed $RPM_{average}$.

* * * * *